US012666157B1

(12) United States Patent
King et al.

(10) Patent No.: US 12,666,157 B1
(45) Date of Patent: Jun. 23, 2026

(54) DEVICE, METHOD AND SYSTEM FOR BLOCKING UNAUTHORIZED IMAGE ACQUISITION USING INFRARED LIGHTS AND VARIABLE TRANSMISSIVITY SCREENS

(71) Applicant: MOTOROLA SOLUTIONS, INC., Chicago, IL (US)

(72) Inventors: Melanie King, Tampa, FL (US); Kaveh Malakuti, Savannah, GA (US); Hok Man Herman Lo, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/999,283

(22) Filed: Dec. 23, 2024

(51) Int. Cl.
*H04N 23/74* (2023.01)
*H04N 23/667* (2023.01)
*H04N 23/71* (2023.01)

(52) U.S. Cl.
CPC ........... *H04N 23/74* (2023.01); *H04N 23/667* (2023.01); *H04N 23/71* (2023.01)

(58) Field of Classification Search
CPC ....... H04N 23/74; H04N 23/667; H04N 23/71
See application file for complete search history.

(56) References Cited

U.S. PATENT DOCUMENTS

| | | | |
|---|---|---|---|
| 8,101,905 B2 * | 1/2012 | Rogers ................. | G01J 5/0275 |
| | | | 250/252.1 |
| 9,140,444 B2 | 9/2015 | Connor | |
| 10,075,625 B2 | 9/2018 | Tabirian et al. | |
| 11,039,028 B2 | 6/2021 | Zhang et al. | |
| 2004/0027695 A1 * | 2/2004 | Lin ......................... | B60R 1/083 |
| | | | 359/839 |
| 2013/0162817 A1 * | 6/2013 | Bernal ................. | G06V 40/161 |
| | | | 382/105 |
| 2019/0394387 A1 | 12/2019 | Wood et al. | |
| 2022/0205763 A1 | 6/2022 | Arwari | |
| 2022/0283036 A1 * | 9/2022 | Everett ................. | G01J 5/061 |

* cited by examiner

*Primary Examiner* — Thai Q Tran
*Assistant Examiner* — Jose M Mesa
(74) *Attorney, Agent, or Firm* — PERRY + CURRIER INC. (FOR MSI)

(57) ABSTRACT

A computing device receives calibration images acquired by an image sensor in the presence of infrared light emitted by an infrared light source and/or in the presence of a variable transmissivity screen between the image sensor and items behind the variable transmissivity screen. The computing device analyzes the calibration images to determine whether the image sensor is saturated and/or whether features of the items are discernible in the calibration images. When the image sensor is not saturated and/or the features are discernible, the computing device controls the infrared light source to adjust settings of the infrared light source and/or the variable transmissivity screen example to find settings where the image source is saturated and/or the features are not discernible. Such settings may be used in a block mode to prevent consumer cameras from acquiring images of the items.

19 Claims, 7 Drawing Sheets

DEVICE, METHOD AND SYSTEM FOR BLOCKING UNAUTHORIZED IMAGE ACQUISITION USING INFRARED LIGHTS AND VARIABLE TRANSMISSIVITY SCREENS

BACKGROUND OF THE INVENTION

Cameras have become ubiquitous since they are included on consumer mobile phones. In public-safety incidents, such consumer cameras may be used to acquire images of items that may require privacy, such as license plates, faces of participants in the incident, and the like. At the same time, first responders may be required to use their cameras to acquire photos of public-safety incidents.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
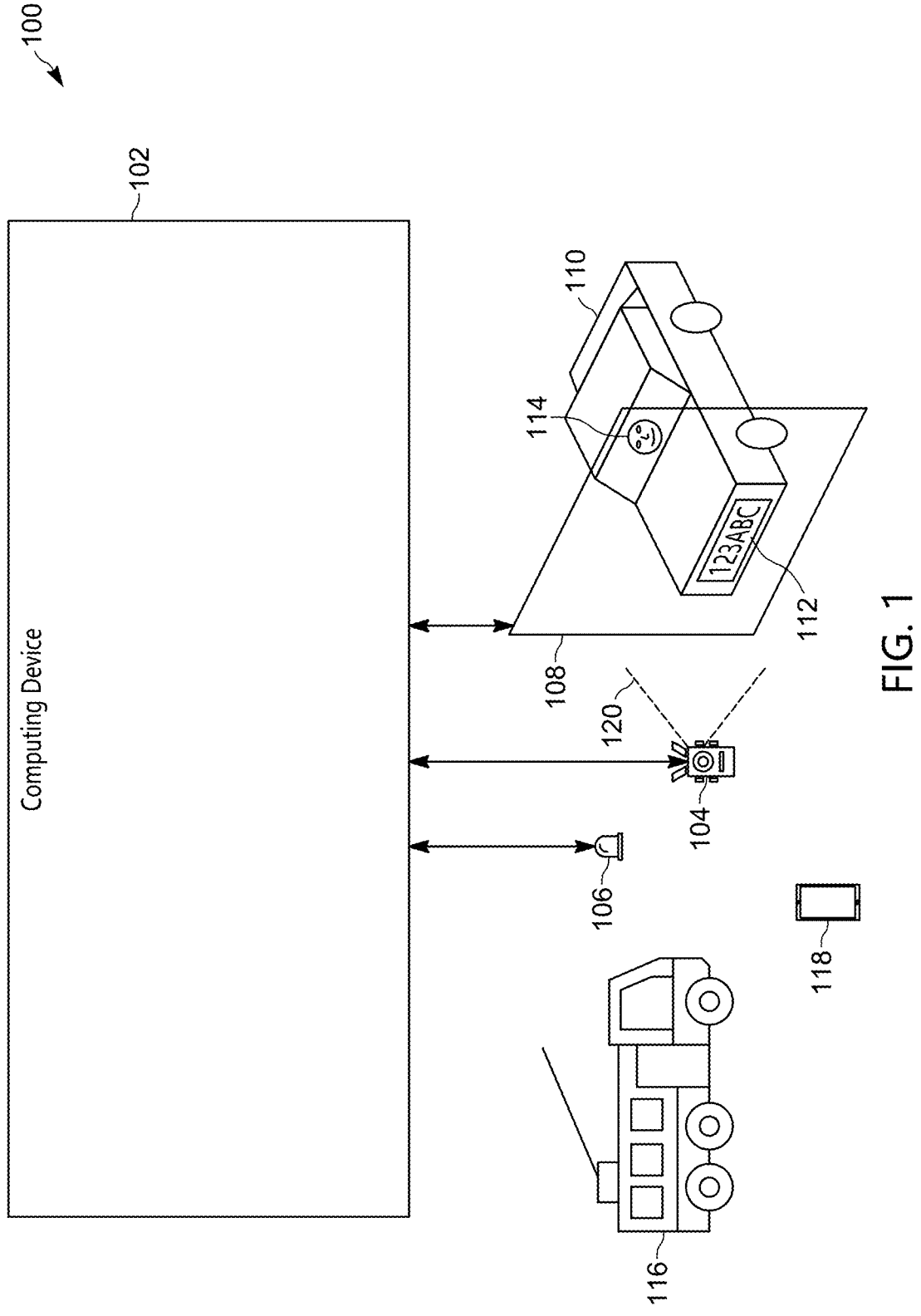
FIG. 1 is a system for blocking unauthorized image acquisition using infrared lights and variable transmissivity screens, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and process components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Ensuring privacy at public-safety incidents may not only be desired, but may be mandatory in some jurisdictions.

While first responders may generally need to acquire images of the public-safety incident using their cameras, it is difficult to allow such images to be acquired while also preventing members of the general public/bystanders from acquiring images of a public-safety incident using their mobile phone cameras.

Thus, there exists a need for an improved technical process, device, and system for blocking unauthorized image acquisition using infrared lights and variable transmissivity screens.

One solution would be to mount infrared light sources around the scene of an incident, and flood the incident with infrared light at intensity levels that would saturate image sensors of consumer cameras. In particular, first responder image sensors (e.g., cameras) may be provided with infrared cut filters, which may filter out such infrared light, however when acquiring images at night, such first responder image sensors may generally be placed in a night mode in which such infrared cut filters are removed (e.g., rotated out) from the first responder image sensors. As such, in the night mode, the first responder image sensors may also be saturated if infrared light were to flood the incident.

Hence, as provided herein, an infrared light source may be provided at an incident which may be controlled to alternate between an unblock mode, in which first responder image sensors may acquire images of items of the incident (e.g. image acquisition of the image sensors is not blocked and/or unblocked), and a block mode in which image sensors attempting to acquire images of the items of the incident are saturated (e.g. image acquisition of the image sensors is blocked).

For example, in the block mode, intensity of infrared light emitted by the infrared light source may be at an intensity that saturates an image sensor, while, in the unblock mode, intensity of infrared light emitted by the infrared light source may be at an intensity that does not saturate an image sensor. In these examples, an image sensor of a first responder may be synchronized with the infrared light source such that, when the infrared light source is in the unblock mode, the first responder image sensor acquires images, whereas, in the block mode, the first responder image sensor does not acquire images. The alternation between the unblock mode and the block mode may occur at a frequency that is selected such that consumer image sensors/cameras, operated by bystanders, attempting to acquire images of the incident will remain saturated when the infrared light source is in the unblock mode, as described in more detail below.

Furthermore, a pattern of alternation between the unblock mode and the block mode may be "unique" and/or not merely the unblock mode and the block mode being "on" and "off" for equal time periods; rather, a pattern of alternation may be selected such that the unblock mode and the block mode are "on" and "off" for different time periods. Put another way, a waveform of modulation of the infrared light is not a regular waveform with 50% duty cycle.

Returning to the frequency of alternation between the unblock mode and the block mode of the infrared light source, consumer image sensors/cameras generally roll their shutters at frequencies that eliminate interference from visible lights, such as 60 Hz in North America and 50 Hz in much of the rest of the world. As such, a frequency of alternation between the unblock mode and the block mode of the infrared light source may be selected that is not divisible by 50 Hz or 60 Hz, and which may generally be about double, or more than double such frequencies. For example, to ensure that consumer image sensors/cameras operating with shutter rolls at both 50 Hz and 60 Hz are saturated in the unblock mode and the block mode of the infrared light source, a frequency of alternation between the unblock mode and the block mode of the infrared light source that is not divisible by 50 Hz and 60 Hz to ensure that, in the block mode, infrared light from the infrared light source is being acquired by the consumer image sensors/cameras when the consumer image sensors/cameras are acquiring images, which may lead to saturation of the consumer image sensors/cameras and/or major artifacts in images acquired by the consumer image sensors/cameras. For example, a frequency of alternation between the unblock mode and the block mode of the infrared light source may be selected that is at least 100 Hz, and is not divisible by 50 Hz and 60 Hz so that, when consumer image sensors/cameras is acquiring images, the consumer image sensors/cameras is strobed by infrared light from the infrared light source at least once. Hence, a frequency of alternation between the unblock mode and the block mode may be 115 Hz, 125 Hz, 130 Hz, amongst other possibilities, but not 100 Hz, 120 Hz, 150 Hz, or 180 Hz.

Hence, according to the present specification, because the infrared lights source is modulating infrared light that is different from a rolling shutter frequency of consumer image sources/cameras, and as duty cycle of the infrared light source is modulated according to a non-50% pattern that is "known" only to authorized image sources, any other image source that acquires images under normal (e.g., consumer) operating conditions will be affected (saturated or record major artifacts in the image).

Furthermore, a frequency and duty cycle (e.g., pattern) of modulation may be communicated to infrared lights sources and image sensors at a beginning of an authorization process, such as during a handshake between such infrared lights sources and such image sensors.

At the same time, the infrared light source may need to be operated in the block mode at as low an intensity as possible to saturate image sensors so as to not expose skin and/or eyes of first responders and/or bystanders to excessive infrared light. Similarly, an infrared light source may be used that emits infrared light at low near infrared (NIR) wavelengths, such as from about 700 nm to about 900 nm, to reduce the possibility of harming skin and/or eyes of first responders and/or bystanders. In some examples, a wavelength of infrared light is selected that is greater than about 760 nm to keep the wavelength high enough to be invisible to humans for covert operational reasons and to prevent strobe light effects that may trigger adverse medical effects in humans.

However, the block mode may be achieved in other ways, such as by rotating the infrared light source, controlling a frequency of the infrared light source, and the like, such that the intensity of the infrared light source in the block mode, relative to the various image sensors, saturates the image sensors.

Alternatively, or in addition, a similar effect may be achieved by deploying a variable transmissivity screen between the various image sensors and items at the incident scene, with such a variable transmissivity screen being controllable between different transmissivity states. Such a variable transmissivity screen may comprise a variable polarizing screen and/or smart glass (e.g., switchable glass, dynamic glass, and/or smart-tinting glass) and/or an electrochromic panel. For example, in an unblock mode, the variable transmissivity screen may be at least partially transparent; in a block mode, the variable transmissivity screen may be at least partially opaque and/or opaque enough to prevent consumer image sensors/cameras from acquiring images of the items through the variable transmissivity screen. Similar to the infrared light source, a first responder image sensor may be synchronized with the block mode and unblock mode of the variable transmissivity screen such that, in the unblock mode, the first responder image sensor acquires images of the items through the variable transmissivity screen, and in the block mode, the first responder image sensor does not acquire images of the items through the variable transmissivity screen. The alternation between the block mode and the unblock mode may be fast enough such that the variable transmissivity screen, in the unblock mode, is partially transparent for a time period that is generally shorter than a frame time and/or fastest shutter speed of a consumer image sensor/camera, which may be heuristically determined. However, a frequency of alternation between the block mode and the unblock mode of the variable transmissivity screen may be selected according to the rolling shutter speed of consumer image sources/cameras and may be a same frequency, or similar frequency, as the frequency of alternation between the block mode and the unblock mode of the infrared light source.

Alternatively, or in addition, both an infrared light source and a variable transmissivity screen may be deployed at an incident, and controlled, in combination, between respective unblock and block modes, with a first responder image sensor synchronized with the unblock and block modes.

Furthermore, use of an infrared light source and/or a variable transmissivity screen may depend on ambient light and/or whether or not the incident is occurring in daylight or at night. It is understood that a calibration process to determine the respective unblock and block modes of the infrared light source and the variable transmissivity screen may occur, and repeated as the ambient light changes, which may be detected from changes in the images from the first responder image sensor acquired in the unblock mode. Such a calibration process may result in only the infrared light source being controlled between unblock and block modes, or only the variable transmissivity screen being controlled between unblock and block modes, with the other of the infrared light source and the variable transmissivity screen remaining in an unblock mode. Such a calibration process may occur using a first responder image sensor to determine settings, and/or combinations of settings, of the infrared light source and the variable transmissivity screen for the unblock and block modes, as described herein.

An aspect of the present specification provides a method comprising: receiving, via a computing device, calibration images acquired by an image sensor in a presence of infrared light emitted by an infrared light source; analyzing, via the computing device, the calibration images to determine whether the image sensor is saturated; and when the image sensor is not saturated, controlling, via the computing device, the infrared light source to adjust one or more of a direction, frequency of light modulation, and intensity of the infrared light based on the calibration images.

Another aspect of the present specification provides a computing device comprising: a controller communicatively coupled to an image sensor and an infrared light source; and a computer-readable storage medium having stored thereon program instructions that, when executed by the controller, causes the controller to perform a set of operations comprising: receiving calibration images acquired by an image sensor in a presence of infrared light emitted by an infrared light source; analyzing the calibration images to determine whether the image sensor is saturated; and when the image sensor is not saturated, controlling the infrared light source to adjust one or more of a direction, frequency of light modulation, and intensity of the infrared light based on the calibration images.

Another aspect of the present specification provides a method comprising: receiving, via a computing device, calibration images of items acquired by an image sensor through a variable transmissivity screen, the variable transmissivity screen controllable to different transmissivity states; analyzing, via the computing device, the calibration images to determine whether the items are discernable in the calibration images; and when the items are not discernable, controlling, via the computing device, a transmissivity state of the variable transmissivity screen based on the calibration images.

Another aspect of the present specification provides a computing device comprising: a controller communicatively coupled to an image sensor and an infrared light source; and a computer-readable storage medium having stored thereon program instructions that, when executed by the controller, causes the controller to perform a set of operations comprising: synchronizing the image sensor and the infrared light source to alternate between: an unblock mode where: the image sensor acquires images; and the infrared light source is controlled to an unblock mode intensity where the image sensor is unsaturated; and a block mode where: the image sensor does not acquire the images; and the infrared light source is controlled to a block mode intensity where other image sensors are at least partially saturated.

Another aspect of the present specification provides a computing device comprising: a controller communicatively coupled to an image sensor and a variable transmissivity screen controllable to different transmissivity states; and a computer-readable storage medium having stored thereon program instructions that, when executed by the controller, causes the controller to perform a set of operations comprising: receiving calibration images of items acquired by the image sensor through a variable transmissivity screen, the variable transmissivity screen controllable to different transmissivity states; analyzing, via the computing device, the calibration images to determine whether the items are discernable in the calibration images; and when the items are not discernable, controlling, via the computing device, a transmissivity state of the variable transmissivity screen based on the calibration images.

Another aspect of the present specification provides a computing device comprising: a controller communicatively coupled to an image sensor and a variable transmissivity screen, the variable transmissivity screen controllable to different transmissivity states; and a computer-readable storage medium having stored thereon program instructions that, when executed by the controller, causes the controller to perform a set of operations comprising: synchronizing the image sensor and the variable transmissivity screen to alternate between: an unblock mode where: the image sensor acquires images through the variable transmissivity screen; and the variable transmissivity screen is controlled to an unblock mode transmissivity state that transmits light; and a block mode where: the image sensor does not acquire the images; and the variable transmissivity screen is controlled to a block mode transmissivity state that at least partially blocks the light from being transmitted therethrough.

Another aspect of the present specification provides a system comprising: an infrared light source; a variable transmissivity screen controllable to different transmissivity states; an image sensor; and a computing device communicatively coupled to the infrared light source, the variable transmissivity screen and the image sensor, the computing device storing program instructions that, when executed by the computing device, causes the computing device to perform a set of operations comprising: determining an unblock mode where: the image sensor acquires images through the variable transmissivity screen; and the combination of the infrared light source and the variable transmissivity screen are respectively controlled to: an unblock mode intensity where the image sensor is unsaturated; and an unblock mode transmissivity state that transmits light; determining a block mode where: the image sensor does not acquire the images; and the combination of the infrared light source and the variable transmissivity screen are respectively controlled to: a block mode intensity where other image sensors are at least partially saturated; and a block mode transmissivity state that at least partially blocks the light from being transmitted therethrough, such that, in the block mode, the other image sensors are prevented from acquiring respective images that include items located behind the variable transmissivity screen; and synchronizing the image sensor and a combination of the infrared light source and the variable transmissivity screen to alternate between the unblock mode and the block mode.

Each of the above-mentioned embodiments will be discussed in more detail below, starting with example system and device architectures of the system in which the embodiments may be practiced, followed by an illustration of processing blocks for achieving an improved technical process, device, and system for blocking unauthorized image acquisition using infrared lights and variable transmissivity screens.

Example embodiments are herein described with reference to flowchart illustrations and/or block diagrams of processes, apparatus (systems) and computer program products according to example embodiments. It will be understood that each block of the flowchart illustrations and/or block diagrams, and combinations of blocks in the flowchart illustrations and/or block diagrams, can be implemented by computer program instructions and/or program code and/or computer program code. These computer program instructions and/or program code may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The processes set forth herein need not, in some embodiments, be performed in the exact sequence as shown and likewise various blocks may be performed in parallel rather than in sequence. Accordingly, the elements of processes are referred to herein as "blocks" rather than "steps."

These computer program instructions and/or program code may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions and/or program code may also be loaded onto a computer or other programmable data processing apparatus that may be on or off-location, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for blocking unauthorized image acquisition using infrared lights and variable transmissivity screens. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

The system 100 comprises a computing device 102 communicatively coupled with an image sensor 104, an infrared light source 106 and a variable transmissivity screen 108. For example, as depicted, the image sensor 104, the infrared light source 106 and the variable transmissivity screen 108 have been deployed at a scene of a public-safety incident that includes a vehicle 110 that has a license plate 112 and has a person 114 inside the vehicle 110. The vehicle 110 may have been in an accident for example, with first responders (e.g., police officers, firefighters, emergency medical technicians) and/or first responder vehicles being deployed to the accident, as represented by a firetruck 116 in FIG. 1.

At the same time, FIG. 1 further depicts another image sensor 118 which may, for example, may comprise, and/or be a component of, a consumer mobile phone that is operated by a bystander and/or member of the general public (not depicted), who may be attempting to use the other image sensor 118 to acquire images of the accident (e.g., to post on social media sites, and/or sell). The image sensor 118 may comprise a charge coupled device (CCD) and/or CCD camera, and/or any other suitable digital image sensor. Such images acquired by the other image sensor 118 that include the license plate 112 and facial features of the person 114 may violate the privacy of the person 114, as well as jurisdictional regulations that may require that participants in incident be provided with privacy while first responders are responding to incidents.

However, features of the license plate 112 (e.g., such as alphanumeric text) and facial features of the person 114 are understood to be only two examples of personally identifiable information (PII) that may be present at a public-safety incident and subject to privacy, whether as a jurisdictional preference, and/or determined via jurisdictional regulations. However, any other suitable features and/or details and/or PII that may be subject to privacy are within the scope of the present specification.

The image sensor 104, as depicted, may comprise, and/or be a component of, a body worn camera (BWC) and/or a mobile communication device (e.g., a radio) of a first responder (not depicted, but understood to be present), who is investigating and/or responding to the accident. However the image sensor 104 may comprise, and/or be a component of, any suitable camera device being used by a first responder and/or that is associated with a first responder. Indeed, the image sensor 104 may comprise a CCD and/or CCD camera, and/or any other suitable digital image sensor. Furthermore, the image sensor 104 may be mobile, or in a fixed position, for example mounted to the firetruck 116, fixed to a tripod (not depicted), and the like. Regardless, it is understood that the image sensor 104 is to be used to acquire images of the accident that include the vehicle 110, the license plate and the person 114.

A calibration process is next described, where the computing device 102 may use images from the image sensor 104 to calibrate the infrared light source 106 to determine settings of the infrared light source 106 that cause infrared light emitted by the infrared light source 106 to not saturate, and saturate the image sensor 104. In these examples, it is understood that the vehicle 110, including the license plate 112 and facial features of the person 114, is in a field-of-view (FOV) 120 of the image sensor 104 and that the variable transmissivity screen 108 is between the image sensor 104 and the vehicle 110. Put another way, the image sensor 104 is positioned such that the image sensor 104 is acquiring images of the vehicle 110, including the license plate 112 and facial features of the person 114, through the variable transmissivity screen 108. It is further understood that the variable transmissivity screen 108 is positioned in such a manner so as to be between the other image sensor 118 and the vehicle 110, including the license plate 112 and facial features of the person 114, such that the other image sensor 118 is attempting to acquire images of the vehicle 110, including the license plate 112 and facial features of the person 114, through the variable transmissivity screen 108

In the calibration process, settings of the infrared light source 106 are understood to be adjusted while the image sensor 104 is acquiring images (e.g., of the vehicle 110, including the license plate 112 and facial features of the person 114) and settings of the infrared light source 106 that may be adjusted may include, but are not limited to, a direction, frequency of light modulation, and intensity of the infrared light emitted by the infrared light source 106.

Put another way, in some examples, a direction of infrared light emitted by the infrared light source 106 may be adjustable. For example, the infrared light source 106 may be rotatable via a stepper motor controlled by the computing device 102. Alternatively, or in addition, infrared light emitting modules of the infrared light source 106, such as infrared light emitting diodes, may be provided in sectors that emit infrared light in different directions, and such sectors may be turned on and off by the computing device 102 to change a direction of infrared light emitted by the infrared light source 106. Hence, in these examples, a direction of the infrared light emitted by the infrared light source 106 may be adjusted to effectively control the infrared light emitted by the infrared light source 106 to different intensities in particular directions, such as towards the vehicle 110 and away from the vehicle 110.

Alternatively, or in addition, a frequency of light modulation of infrared light emitted by the infrared light source 106 may be adjustable by the computing device 102, and/or an "on" and "off" duty cycle of the infrared light source 106 may be adjustable in a pulse-width modulation (PWM) scheme, and the like, by the computing device 102. Hence, in these examples, a frequency and/or a PWM frequency, of the infrared light emitted by the infrared light source 106 may be adjusted by the computing device 102 to effectively control the infrared light emitted by the infrared light source 106 to different intensities.

Alternatively, or in addition, an intensity of infrared light emitted by the infrared light source 106 may be adjustable by the computing device 102 between a minimum intensity and a maximum intensity, and intensities in between.

However, regardless of which setting is being adjusted, an intensity of infrared light that does not saturate the image sensor 104 may be a minimum intensity and/or zero intensity of infrared light emitted by the infrared light source 106. However, a non-zero intensity of infrared light may be selected (e.g., by the computing device 102) that enhances and/or improves quality of images acquired by the image sensor 104; such a situation may occur in nighttime settings.

Conversely, an intensity of infrared light that saturates the image sensor 104 may be a maximum intensity of infrared light emitted by the infrared light source 106. However, a non-maximum intensity may be selected (e.g., by the computing device 102) to reduce power consumption of the infrared light source and/or to protect skin and/or eyes of humans at the incident (e.g., first responders, bystanders, and the like) from exposure to infrared light, as described herein. Indeed, in some examples, an intensity of infrared light that saturates the image sensor 104 may be selected, that is a minimum intensity necessary for saturating the image sensor 104.

In such examples, in the calibration process, images from the image sensor 104 of the vehicle 110 that include the license plate 112 and facial features of the person 114 may be acquired at the computing device 102 while adjusting settings of the infrared light source 106 to determine settings at which the image sensor 104 is saturated and not saturated. For images that are not saturated, the computing device 102 may perform image analysis to ensure that the license plate 112 and facial features of the person 114 are discernible in the images.

In some examples, the variable transmissivity screen 108 may be optional. In examples where the variable transmissivity screen 108 is not present, calibration of the infrared light source 106 occurs without the variable transmissivity screen 108. Regardless, the variable transmissivity screen 108 is understood to be controllable to different transmissivity states, for example between a minimum transmissivity and a maximum transmissivity.

However, in examples where the variable transmissivity screen 108 is present, in the calibration process, settings of the variable transmissivity screen 108 may be adjusted in combination with adjusting settings of the infrared light source 106, to determine combinations of respective settings of the infrared light source 106 and the variable transmissivity screen 108 where the image sensor 104 is saturated and not saturated.

Alternatively, or in addition, in examples where the variable transmissivity screen 108 is present, in the calibration process, settings of the variable transmissivity screen 108 may be adjusted in combination with adjusting settings of the infrared light source 106 to determine combinations of respective settings of the infrared light source 106 and the variable transmissivity screen 108 where images acquired by the image sensor 104 do not include, and include, details of the license plate 112 and the facial features of the person 114, and/or settings where such details are discernible and not discernible, as described herein.

For example, the variable transmissivity screen 108 may be adjusted to a transmissivity state that transmits, and/or at least partially transmits, light, and to a respective transmissivity state that blocks, and/or at least partially blocks, light from being transmitted therethrough.

In yet further examples, the infrared light source 106 may be optional and calibration of the variable transmissivity screen 108 occurs without calibration of the infrared light source 106.

In such examples, in a respective calibration process, images from the image sensor 104 of the vehicle 110 through the variable transmissivity screen 108 may be acquired at the computing device 102 while adjusting settings of the variable transmissivity screen 108 to determine settings at which the image sensor 104 includes and does not include the license plate 112 and facial features of the person 114. For example, the computing device 102 may perform image analysis on the images received from the image sensor 104 to determine transmissivity states of the variable transmissivity screen 108 where the license plate 112 and a facial features of the person 114 are discernible and not discernible in the images.

While the term "discernible" as used herein may be a relative term, it is understood to have a technical meaning. For example, for a feature and/or item and/or detail (e.g., hereafter, a feature) in an image to be discernible by the computing device, the feature is understood to be detectable in the image using image analysis techniques that may include, but is not limited to, feature extraction, object recognition, and the like. In the example of the license plate 112, the license plate 112 is understood to be discernible in an image when characters of the license plate 112 are determined from the image. When characters of the license plate 112 cannot be determined from an image, the license plate 112 is understood to be not discernible from the image.

Similarly, in the example of the facial features of the person 114, the facial features of the person 114 are understood to be discernible in an image when certain facial features of the person 114, such as eyes, nose and mouth, are determined from the image. When the facial features of the person 114 cannot be determined from an image, facial features of the person 114 are understood to be not discernible from the image.

Put another way, the computing device 102 may determine that features of images from the image sensor 104 are not discernible when feature extraction and/or object recognition of the image analysis fails to extract features that the image analysis has been configured to extract and/or fails to recognize objects that the image analysis has been configured to recognize. Conversely, the computing device 102 may determine that features of images from the image sensor 104 are discernible when feature extraction and/or object recognition of the image analysis successfully extracts features that the image analysis has been configured to extract and/or successfully recognizes objects that the image analysis has been configured to recognize.

Put yet another way, the computing device 102 may be generally configured to search for certain types of features in images, such as license plate numbers and/or facial features of persons, amongst other possibilities, and, when those features are not found, the computing device 102 may determine that such features are not discernible in the images. Conversely, when those features are found, the computing device 102 may determine that such features are discernible in the images.

Furthermore, it is understood that image sensors described herein may be saturated by infrared light. The term "saturated" is understood to include a state in which an image sensor generates an image with light or signal that is above a maximum capacity of the image sensor to measure, causing pixel values to reach their upper limit and resulting in a loss of detail in the brightest areas of the image. Hence, when the image sensor 104 is saturated, features and/or details of an image may not be discernible. To determine whether or not the image sensor 104 is saturated, the computing device 102 may process images from the image sensor 104 to determine whether pixel values of the images have reached an upper limit (e.g., are "white" and/or red green and blue pixel values are between about 95% and about 100%, between about 97% and about 100%, between about 99% and about 100%, amongst other possibilities) and/or whether features in the images are discernible. In the example of determining whether pixel values of the images have reached an upper limit, such pixel values are understood to indicate that the image sensor 104 is saturated when a threshold percentage of the pixel values have reached the upper limit, such as 75%, 80%, 85%, 95%, amongst other possibilities. Alternatively, or in addition, such pixel values are understood to indicate that the image sensor 104 is saturated when the pixel values that have reached the upper limit are located in a given regions of an image, such as a center of the image, as well as a given percentage of pixels around the given region/center, such as 75%, 80%, 85%, 95%, amongst other possibilities.

Indeed, the computing device 102 may simultaneously implement several processes for determining whether or not settings of the infrared light source 106 and/or the variable transmissivity screen 108 may be used in a block mode or an unblock mode. For example, the computing device 102 may be configured to determine when the image sensor 104 is saturated by determining when pixel values of images from the image sensor 104 have reached an upper limit, and/or the computing device 102 may be configured to determine when the image sensor 104 is saturated by determining when features in images from the image sensor 104 are not discernible.

Conversely, the computing device 102 may be configured to determine when the image sensor 104 is not saturated by determining when pixel values of images from the image sensor 104 are in a particular range (e.g., plus or minus 20%, 30%, 40% from a midway between a lower limit and an upper limit), and/or the computing device 102 may be configured to determine when the image sensor 104 is not saturated by determining when features in images from the image sensor 104 are discernible.

For example, in a calibration process, as the computing device 102 is adjusting settings of the infrared light source 106 and/or the variable transmissivity screen 108, and receiving images from the image sensor 104, settings that may be used in a block mode may be stored when the image sensor 104 is saturated and/or features are not discernable in images from the image sensor 104, and respective settings that may be used in an unblock mode may be stored when the image sensor 104 is not saturated and/or features are discernable in images from the image sensor 104.

The calibration process may further be used to establish a duty cycle and/or pattern of the block mode and unblock modes. However, any suitable combinations of frequency and duty cycle (e.g., pattern) in which the image sensor 104 is saturated (e.g., when operated at the rolling shutter frequency of the other image sensor 104), is within the scope of the present specification.

In general, the computing device 102 may then operate the image sensor 104 and any suitable combination of the infrared light source 106 and/or the variable transmissivity screen 108 to alternate between an unblock mode and a block mode. In the block mode, the image sensor 104 does not acquire images, and the infrared light source and/or the variable transmissivity screen 108 are operated according to block mode settings determined in the calibration process. In the block mode it is understood that the other image sensor 118 is prevented from acquiring images of the vehicle 110 and/or the license plate 112 and/or the facial features of the person 114 as the other image sensor 118 is saturated, and/or cannot acquire of the vehicle 110 and/or the license plate 112 through the variable transmissivity screen 108 when opaque.

In the unblock mode, the image sensor 104 acquires images, and the infrared light source 106 and/or the variable transmissivity screen 108 are operated according to unblock mode settings determined in the calibration process.

In the unblock mode it is understood that the other image sensor 118 is still prevented from acquiring images of the vehicle 110 and/or the license plate 112 and/or the facial features of the person 114 as the system 100 alternates between the block mode and the unblock mode at a frequency that is selected to be not divisible by a rolling shutter speed of the other image sensor 118 (e.g., a consumer image sensor/camera rolling shutter speed). Put another way, at such a frequency, the other image sensor 118 is exposed to the infrared light at least once in each acquisition of a respective image such that the other image sensor 118 saturates. Alternatively, or in addition, a rate at which the variable transmissivity screen 108 alternates between an unblock mode and a block mode is faster than a rate at which the other image sensor 118 may acquire images, so that, on average, the other image sensor 118 "sees" the variable transmissivity screen 108 as opaque.

Indeed, using an assumption that the image sensor 104 may be controlled to a similar rolling shutter speed of the other image sensor 118 and/or consumer cameras in general, the computing device 102 may further vary the frequency of alternating between the block mode and the unblock mode in the calibration process to determine a frequency where the image sensor 104, when the image sensor 104 controlled to a similar rolling shutter frequency of the other image sensor 118 (e.g., 50 Hz and/or 60 Hz).

As such, the image sensor 104 may not be able to acquire images of the license plate 112 and the facial features of the person 114 when the image sensor 104 attempts to acquire images in both the block mode and the unblock mode.

Indeed, it is also understood that, in the calibration process, the image sensor 104 is controlled to settings that may mimic settings and/or average settings of consumer cameras.

It is hence further understood that when the image sensor 104 is not acquiring images when the system 100 is in the block mode, the image sensor 104 may be placed into a state where the image sensor 104 is not saturated. For example, a shutter may be closed at the image sensor 104, an infrared cutoff filter may be placed in front a CCD of the image sensor 104 (e.g., automatically) and/or a CCD of the image sensor 104 may be temporarily turned off, and the like.

It is further understood that a frequency at which the system 100 is switched between the block mode and the unblock mode is compatible with a frequency at which the image sensor 104 may be controlled to acquire images in the block mode, and placed into a state in the unblock mode where the image sensor 104 is not saturated and not acquiring images. Put another way, when the other image sensor 118 is exposed to infrared light from the infrared light source 106 at its rolling shutter speed when acquiring any images in any mode, the other image sensor 118 is saturated; in contrast, the image sensor 104 is operated in a manner that causes the image sensor 104 not to be saturated in the unblock mode.

It is furthermore understood that a frequency and duty cycle (e.g., pattern) of the block mode and the unblock mode may be determined by the computing device 102 in a calibration process. Furthermore, once the frequency and duty cycle (e.g., pattern) have been determined at the computing device 102, the frequency and duty cycle may be communicated to the image sensor 104 and the infrared light source 106 (e.g., and the variable transmissivity screen 108 when used) in authorization process that may be implemented by the computing device 102, and/or the computing device 102 may communicate the determined frequency and duty cycle to computer-aided dispatch (CAD) system that may have dispatched first responders and/or vehicles (e.g., such as the firetruck 116) to an incident.

Furthermore, it is understood that the calibration process may have occurred at the depicted incident scene, and/or the calibration process may have previously occurred with same and/or similar devices as the image sensor 104 and the infrared light source 106 (e.g., and the variable transmissivity screen 108 when used), for example for different ambient light conditions, and frequency and duty cycle (e.g., for different ambient light conditions) may be stored at the CAD system. Hence, the frequency and duty cycle, and/or any other suitable settings of the infrared light source 106 (e.g., and the variable transmissivity screen 108 when used) may be determined "off-line".

In some examples, the CAD system and/or the computing device 102 may communicate with the image sensor 104 and the infrared light source 106 (e.g., and the variable transmissivity screen 108 when used) deployed at the scene of the incident, and authorize the image sensor 104 and the infrared light source 106 (e.g., and the variable transmissivity screen 108 when used) using any suitable authorization process. In such an authorization process, the CAD system and/or the computing device 102 may issue one time encrypted authorization code to the image sensor 104 and the infrared light source 106 (e.g., and the variable transmissivity screen 108 when used) that is used between the image sensor 104 and the infrared light source 106 (e.g., and the variable transmissivity screen 108 when used), and which may also establish synchronization between the image sensor 104 and the infrared light source 106 (e.g., and the variable transmissivity screen 108 when used). This may establish trust and synchronization between the image sensor 104 and the infrared light source 106 (e.g., and the variable transmissivity screen 108 when used) while excluding all the other image sensors 118 affected by the (e.g., random) block mode infrared light source. Furthermore, the CAD system and/or the computing device 102 may periodically and/or randomly change the frequency and/or duty cycle in a similar manner.

Turning now to further details of the system 100, the computing device 102 may comprise a cloud computing device and/or an on-scene computing device (e.g., which may be integrated with the firetruck 116 and/or another first responder vehicle) that is communicatively coupled to the image sensor 104, the infrared light source 106 and the variable transmissivity screen 108. However, while the computing device 102 is depicted as being separate from the image sensor 104, the infrared light source 106 and the variable transmissivity screen 108, in some examples functionality of the computing device 102 may be at least partially implemented by one or more of the image sensor 104, the infrared light source 106 and the variable transmissivity screen 108, presuming the image sensor 104, the infrared light source 106 and the variable transmissivity screen 108 include respective processors and/or controllers, and the like, for implementing processes described herein.

Furthermore, while only one image sensor 104 and one other image sensor 118 are depicted, the system 100 may comprise a plurality of image sensors 104 and/or a plurality of other image sensors 118.

Similarly, while only one infrared light source 106 is depicted, the system 100 may comprise a plurality of infrared light sources 106 distributed around a scene of the incident. Indeed, infrared light sources 106 may be provided as standalone infrared light sources, and/or infrared light sources 106 may be provided at first responder vehicles, such as the firetruck 116. Indeed, an infrared light source 106 may, in some examples, be integrated with an image sensor 104.

Similarly, while only one variable transmissivity screen 108 is depicted, the system 100 may comprise a plurality of variable transmissivity screens 108 distributed around a scene of the incident, for example surrounding the vehicle 110, and/or surrounding a scene of the incident. Furthermore, the variable transmissivity screen 108 may be any suitable size and shape. For example, while the depicted variable transmissivity screen 108 is shown to be about a width and height of the vehicle 110, in some examples a first variable transmissivity screen 108 that is about a size and shape of the license plate 112 may be placed over the license plate 112 (e.g., to prevent images of the license plate 112 from being acquired by the other image sensor 118), and a second variable transmissivity screen 108 that is about a size and shape of a windshield of the vehicle 110 may be placed over the windshield (e.g., to prevent images of the facial features of the person 114 from being acquired by the other image sensor 118). In general, then, one or more variable transmissivity screens 108 may be provided and positioned at a scene of the incident so that any consumer cameras are forced to attempt to acquire images of items through the one or more variable transmissivity screens 108. For example, infrared light from the infrared light source 106 may be limited to light that is not visible to humans (e.g., on average and/or according to an International Commission on Illumination (CIE) color space model, such as the CIE 1931 model. For example, light that is visible to humans may be in a range of about 380 nm to 700 nm, and hence infrared light may be limited to light having wavelengths greater than 700 nm and/or greater than about 760 nm (which is where even the most infrared light sensitive human is generally unable to see light). Non-visible infrared light may be used to prevent bystanders from knowing that the infrared light source 106 is saturating their other image sensors 118, and/or to prevent bystanders from seeing a strobing light.

Furthermore, infrared light from the infrared light source 106 may be limited to certain wavelength ranges of infrared light, such as near infrared (NIR) wavelengths that are between about 700 nm and 1400 nm, to minimize exposure of skin and/or eyes of humans to infrared light.

Hence, the infrared light source 106 may be limited to emitting low NIR wavelengths, such as between about 710 nm and 1000 nm, and/or between about 750 nm and 950 nm, and between about 800 nm and about 900 nm.

Particular infrared wavelength ranges may be provided by one or more of: selecting LEDs for the infrared light source 106 that emit infrared light within these wavelength ranges; configuring the infrared light source 106 with cutoff filters, and the like, amongst other possibilities. In yet further examples, wavelength ranges of LEDs of the infrared light source 106 may be controllable by the computing device 102 (e.g., and may depend on a current and/or a voltage and/or frequency used to drive the LEDs), and in these examples, the LEDS of the infrared light source 106 may be controlled to a predetermined wavelength range.

It is nonetheless understood that any suitable wavelength ranges of infrared light are within the scope of the present specification.

The variable transmissivity screen 108 may comprise any suitable type of screen and/or panel that may be controlled to vary transmissivity, and which may include, but is not limited to, any suitable combination of polarizing screens, smart glass and/or plastic, switchable glass and/or plastic, dynamic glass and/or plastic, smart-tinting glass, and/or plastic and/or an electrochromic panel, and the like, amongst other possibilities.

It is furthermore understood that communication with the computing device 102 may occur in any suitable manner. For example, rather than the image sensor 104 and/or the infrared light source 106 and/or the variable transmissivity screen 108 being directly communicatively coupled to the computing device 102, the image sensor 104 and/or the infrared light source 106 and/or the variable transmissivity screen 108 may be communicatively coupled to the computing device 102 via another communication device, such as a mobile communication device (e.g., a radio) operated by a first responder, which may form a personal area network (PAN) with the image sensor 104 and/or the infrared light source 106 and/or the variable transmissivity screen 108. Alternatively, or in addition, one of the image sensor 104 and/or the infrared light source 106 and/or the variable transmissivity screen 108 act as a hub in such a PAN and communicatively couple the other devices to the computing device 102; for example, the image sensor 104 in the form of a mobile communication device may communicatively couple the infrared light source 106 and/or the variable transmissivity screen 108 to the computing device 102.

Figure 2:
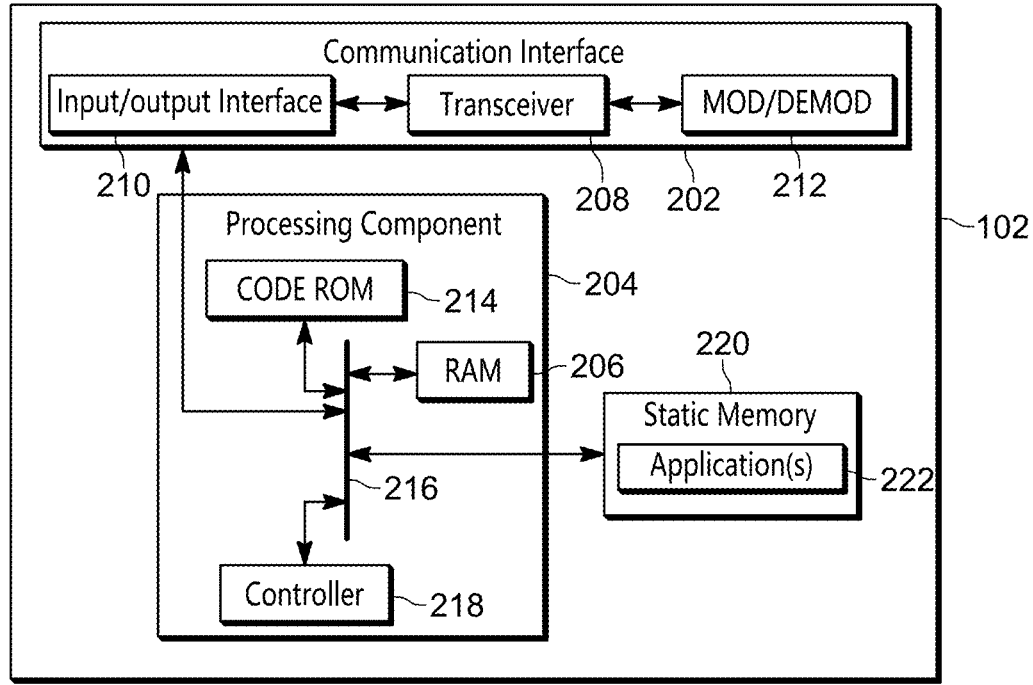
FIG. 2 is a device diagram showing a device structure of a device for blocking unauthorized image acquisition using infrared lights and variable transmissivity screens, in accordance with some examples.

Attention is next directed to FIG. 2, which depicts a schematic block diagram of an example of the computing device 102.

While the computing device 102 is depicted in FIG. 2 as a single component, the computing device 102 may be distributed among a plurality of components and the like including, but not limited to, any suitable combination of one or more servers, one or more cloud computing devices, and the like.

As depicted, the computing device 102 comprises: a communication interface 202, a processing component 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222.

While not depicted, the computing device 102 may include one or more of an input device and a display screen and the like.

As shown in FIG. 2, the computing device 102 includes the communication interface 202 communicatively coupled to the common data and address bus 216 of the processing component 204.

The processing component 204 may include the code Read Only Memory (ROM) 214 coupled to the common data and address bus 216 for storing data for initializing system components. The processing component 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100, such as the image sensor 104, the infrared light source 106 and the variable transmissivity screen 108.

For example, the communication interface 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network.

Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

However, at least a digital mobile radio (DMR) network, a Project 25 (P25) network, a terrestrial trunked radio (TETRA) network and any corresponding DMR transceiver, P25 transceiver, and TETRA transceiver may be dedicated for use by first responder radios and/or any other first responder communication devices.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and one or more TPUs (Tensor Processing Units), and the like, and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for blocking unauthorized image acquisition using infrared lights and variable transmissivity screens. For example, in some examples, the computing device 102 and/or the controller 218 specifically comprises a computer executable engine configured to implement functionality for blocking unauthorized image acquisition using infrared lights and variable transmissivity screens.

The static memory 220 comprises a non-transitory machine readable medium that stores machine readable instructions to implement one or more programs or applications and/or program code. Example machine readable media include a non-volatile storage unit (e.g., Erasable Electronic Programmable Read Only Memory ("EE-PROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

Figure 3:
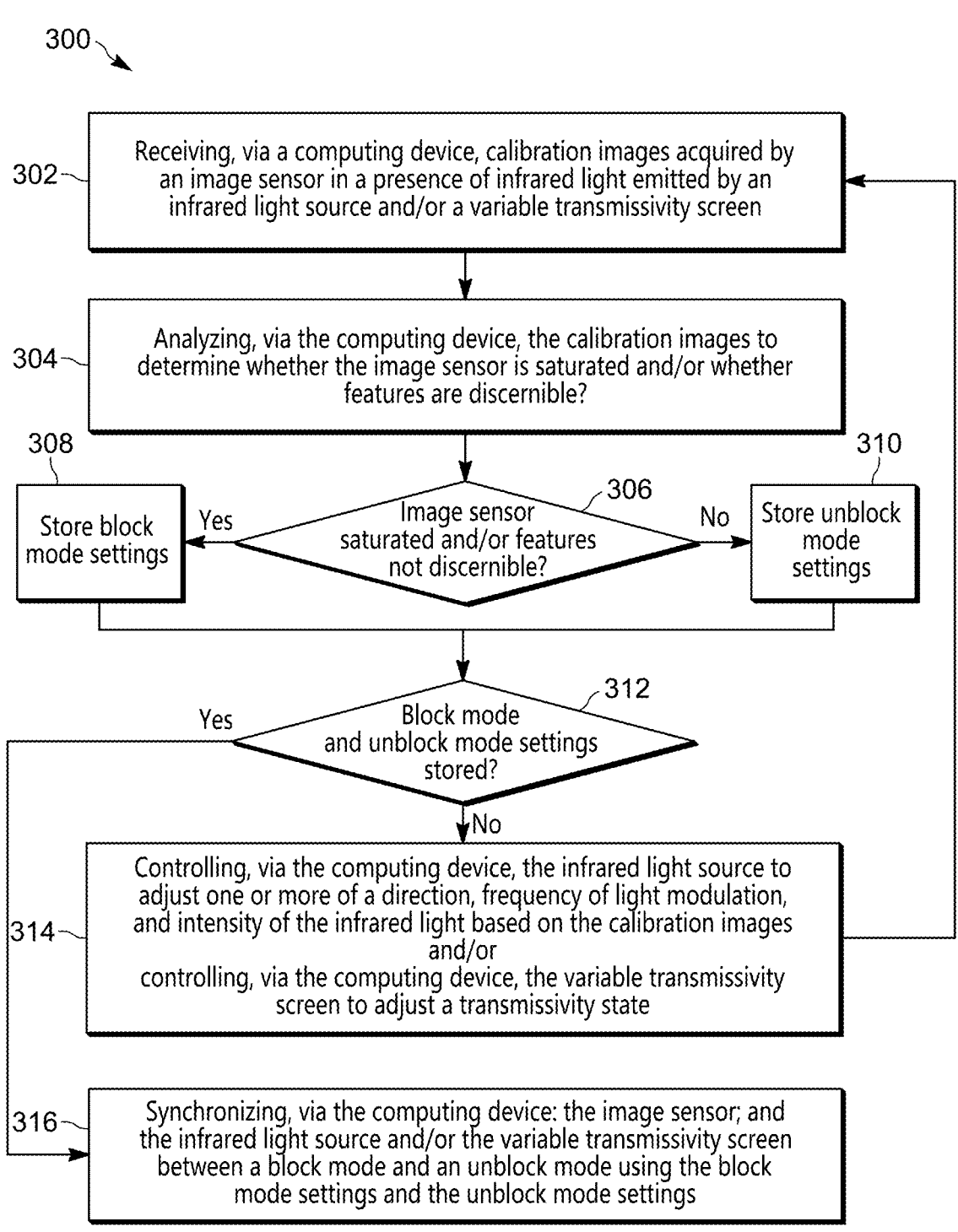
FIG. 3 is a flowchart of a process for blocking unauthorized image acquisition using infrared lights and variable transmissivity screens, in accordance with some examples.

In particular, the memory 220 stores instructions and/or program code corresponding to the at least one application 222 that, when executed by the controller 218, enables the controller 218 to implement functionality for blocking unauthorized image acquisition using infrared lights and variable transmissivity screens, including but not limited to, the blocks of the process set forth in FIG. 3.

The application 222 may include programmatic algorithms, and the like, to implement functionality as described herein, and which may include, but are not limited to programmatic image analysis algorithms that perform feature extraction and/or object recognition.

Alternatively, and/or in addition to programmatic algorithms, the application 222 may include one or more machine learning algorithms to implement functionality as described herein and which may include, but are not limited to programmatic image analysis machine learning algorithms that perform feature extraction and/or object recognition.

The one or more machine learning algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

While structure of the image sensor 104, the infrared light source 106 and the variable transmissivity screen 108 are not depicted, the image sensor 104, the infrared light source 106 and the variable transmissivity screen 108 may have a structure similar to that depicted in FIG. 2, but adapted for respective functionality thereof. For example, the image sensor 104 is understood to comprise a CCD and the like, and components for controlling the image sensor 104 to alternate between a block mode and an unblock mode. Similarly, the infrared light source 106 is understood to comprise infrared LEDs and the like, and components for controlling the infrared LEDs to alternate between a block mode and an unblock mode. Similarly, the variable transmissivity screen 108 is understood to comprise a screen whose transmissivity is controllable and the like, and components for controlling the screen to alternate between a block mode and an unblock mode.

Attention is now directed to FIG. 3, which depicts a flowchart representative of a process 300 for blocking unauthorized image acquisition using infrared lights and/or variable transmissivity screens, and which includes a calibration process. The operations of the process 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The process 300 of FIG. 3 is one way in which the controller 218 and/or the computing device 102 and/or the system 100 may be configured. Furthermore, the following discussion of the process 300 of FIG. 3 will lead to a further understanding of the system 100, and its various components.

The process 300 of FIG. 3 need not be performed in the exact sequence as shown and likewise various blocks may be performed in parallel rather than in sequence. Accordingly, the elements of process 300 are referred to herein as "blocks" rather than "steps." The process 300 of FIG. 3 may be implemented on variations of the system 100 of FIG. 1, as well.

At a block 302, the controller 218, and/or the computing device 102, receives calibration images acquired by the image sensor 104 in a presence of infrared light emitted by the infrared light source 106 and/or in the presence of the variable transmissivity screen 108.

Herein the term "calibration images" is understood to include images acquired by the image sensor 104 while the system 100 is being calibrated.

At a block 304, the controller 218, and/or the computing device 102, analyzes the calibration images and, at a block 306, the controller 218, and/or the computing device 102, determines whether the image sensor 104 is saturated and/or whether the features in the calibration images are discernible.

When the image sensor 104 is saturated and/or when the features in the calibration images are not discernible (e.g., a "YES" decision of the block 306), at a block 308, the controller 218, and/or the computing device 102, stores current settings of the infrared light source 106 and/or the variable transmissivity screen 108, for example at the memory 220, as block mode settings. Conversely, when the image sensor 104 is not saturated and/or when the features in the calibration images are discernible (e.g., a "NO" decision of the block 306), at a block 310, the controller 218, and/or the computing device 102, stores current settings of the infrared light source 106 and/or the variable transmissivity screen 108, for example at the memory 220, as unblock mode settings.

From either the block 308 or the block 310, at a block 312, the controller 218, and/or the computing device 102, determines whether both block mode settings and unblock mode settings are stored and, if not (e.g., a "NO" decision at the block 312), at a block 314, the controller 218, and/or the computing device 102, controls the infrared light source 106 to adjust one or more of a direction, frequency of light modulation, and intensity of the infrared light based on the calibration images, and/or the controller 218, and/or the computing device 102, the variable transmissivity screen 108 to adjust a transmissivity state.

However, when both block mode settings and unblock mode settings are stored (e.g., a "YES" decision at the block 312), at a block 316, the controller 218, and/or the computing device 102, synchronizes: the image sensor 104; and the infrared light source 106 and/or the variable transmissivity screen 108 between a block mode and an unblock mode using the block mode settings and the unblock mode settings. Such synchronization is described in more detail below.

The process 300 is hence generally used to determine the block mode settings and the unblock mode settings for the infrared light source 106 and/or the variable transmissivity screen 108 to be used when synchronizing the image sensor 104 to not acquire and acquire images in the block mode and unblock mode.

The process 300 may include other features.

For example, the process 300 may further include the controller 218, and/or the computing device 102, determining the block mode settings for the infrared light source 106 that use a minimum infrared light intensity to achieve saturation of the image sensor 104 for example to protect exposed skin and/or eyes from infrared exposure. It is understood that such a minimum infrared light intensity may depend on various factors, such as a wavelength of infrared light, an image sensor type and/or sensitivity, aperture size, quantum efficiency, full-well capacity, distance from the infrared light, exposure time, amongst other possibilities, however, for consumer image sensors, such a minimum infrared light intensity, for about 760 nm, may be on the order of $10^{-6}$ W/m$^2$ to $10^{-2}$ W/m$^2$.

However, in practice, determination of an absolute value of the minimum infrared light intensity may not occur; rather a minimum infrared light intensity is selected in the process 300 corresponding to a calibration image in which saturation occurs and/or features in the calibration image are not discernible. Hence, for example, when the intensity of the infrared light from the infrared light source 106 is being increased, for example from zero, then at a given intensity of the infrared light, a calibration image will show saturation after a previous calibration image does not show saturation, and when such a condition occurs the given intensity may be used as the minimum infrared light intensity, and/or, for assurance of saturation, the given intensity may be increased by a factor, such as 5%, 10%, 15%, and the like, to determine the block mode settings for the infrared light source 106.

Similarly, the process 300 may further include the controller 218, and/or the computing device 102, determining the unblock mode settings for the infrared light source 106 that cause features of the calibration images to be enhanced.

Indeed, both examples illustrate that, at the blocks 308, 310, additional decisions may occur as to whether to store, or overwrite, block mode settings and/or unblock mode settings. Indeed, the blocks 302 to 314 may repeat until respective settings are determined that meet any suitable criteria.

Similarly, the process 300 may further include the controller 218, and/or the computing device 102, determining a frequency of alternating between the block mode and the unblock mode. Such a determination of frequency may further comprise a determination of the duty cycle (e.g., pattern) as described herein.

Determination of such a frequency may depend on whether both the infrared light source 106 and the variable transmissivity screen 108 are used, or only one of the infrared light source 106 and the variable transmissivity screen 108 are used.

For example, when only the infrared light source 106 is used, such a determined frequency generally causes the image sensor 104, and hence the other image sensor 118, to remain saturated when acquiring images in both the block mode and the unblock mode, which may be determined by the controller 218, and/or the computing device 102: controlling the image sensor 104 to acquire images while varying frequency of the infrared light source 106 switching between respective block mode settings and unblock mode settings. When a frequency is determined where the image sensor 104 remains saturated in the unblock mode, that frequency may be used in the synchronization at the block 316. Furthermore, in such a determination, settings of the image sensor 104 may be controlled to image acquisition settings (e.g., rolling shutter speed) that may represent typical and/or average image acquisition settings of consumer cameras.

Alternatively, or in addition, when only the infrared light source 106 is present, discernibility of features in the calibration images may be used to determine block mode settings and unblock mode settings.

Furthermore, degrees of discernability of features in the calibration images may be determined, and settings of the infrared light source 106 and the variable transmissivity screen 108 are used as unblock mode settings that correspond to calibration images that have the best discernability. Such a situation is described with reference to FIG. 4.

Indeed, discernibility of features may also be used to determine such a frequency, when only the variable transmissivity screen 108 is used, a determined frequency generally causes the image sensor 104, and hence the other image sensor 118, to acquire images where features are not discernible when acquiring images in both the block mode and the unblock mode, which may be determined by the controller 218, and/or the computing device 102: controlling the image sensor 104 to acquire images while varying frequency of the variable transmissivity screen 108 switching between respective block mode settings and unblock mode settings. When a frequency is found where features in images from the image sensor 104 are not discernible, that frequency may be used in the synchronization at the block 316. Furthermore, in such a determination, settings of the image sensor 104 may be controlled to image acquisition settings (e.g., rolling shutter speed) that may represent typical and/or average image acquisition settings of consumer cameras.

In examples where both the infrared light source 106 and the variable transmissivity screen 108 are used, a determined frequency generally causes the image sensor 104, and hence the other image sensor 118, to acquire images where the image sensor 104 is saturated and/or features are not discernible when acquiring images in both the block mode and the unblock mode, which may be determined by the controller 218, and/or the computing device 102: controlling the image sensor 104 to acquire images while varying frequency of the infrared light source 106 and the variable transmissivity screen 108 switching between respective block mode settings and unblock mode settings. When a frequency is found where the image sensor 104 is saturated and features in images from the image sensor 104 are not discernible, that frequency may be used in the synchronization at the block 316. Furthermore, in such a determination, settings of the image sensor 104 may be controlled to image acquisition settings (e.g., rolling shutter speed) that may represent typical and/or average image acquisition settings of consumer cameras.

Indeed, in examples where the frequency is determined, and both the infrared light source 106 and the variable transmissivity screen 108 are present, then a combination of settings for the infrared light source 106 and the variable transmissivity screen 108 are determined in combination with the frequency. In particular, the frequency may be varied in tandem with the settings for the infrared light source 106 and the variable transmissivity screen 108 when implementing the blocks 302 to 314. It is further understood that a pattern of the synchronization may also be varied.

Indeed, any suitable settings of the settings for the infrared light source 106 and the variable transmissivity screen 108 may be varied at the block 314.

For example, whether or not the variable transmissivity screen 108 is used, the process 300 may further include, but is not limited to, the controller 218, and/or the computing device 102 performing the calibration process comprising: adjusting the infrared light source 106 until the image sensor 104 is saturated when determining block mode settings for the infrared light source 106.

Indeed, in particular examples, adjusting the infrared light source 106 may include one or more of: increasing the intensity of the infrared light emitted by the infrared light source 106, for example until the image sensor 104 is saturated; and decreasing the intensity of the infrared light emitted by the infrared light source 106, for example until the image sensor 104 is not saturated. Indeed, whether the intensity of the infrared light emitted by the infrared light source 106 is increased or decreased may depend on the intensity of the infrared light source 106 at the beginning of the process 300. Indeed, any suitable intensity of the infrared light source 106 at the beginning of the process 300 is within the scope of the present specification, including, but not limited to, the intensity of the infrared light source 106 being at a minimum intensity, a maximum intensity or a halfway intensity between the minimum intensity and the maximum intensity.

In examples where the variable transmissivity screen 108 is not present and/or placed into a transmissive state for the block mode, the process 300 may further comprise: storing (e.g., at the block 308) block mode settings of the infrared light source 106, where the infrared light saturates the image sensor 104; and storing (e.g., at the block 310) unblock mode settings of the infrared light source 106, where the infrared light does not saturate the image sensor 104. Again, the block mode settings may be determined to minimize the intensity of infrared light emitted by the infrared light source 106 in the block mode.

In these examples (e.g., where the variable transmissivity screen 108 is not present and/or placed into a transmissive state for the block mode), at the block 316, the process 300 may further comprise the controller 218, and/or the computing device 102: synchronizing the image sensor 104 and the infrared light source 106 to alternate between: the unblock mode where: the image sensor 104 is acquiring images; and the infrared light does not saturate the image sensor 104; and the block mode where: the image sensor 104 is not acquiring the images; and the infrared light saturates the other image sensors 118.

Indeed, the unblock mode intensity may be at a minimum possible intensity of the infrared light, and/or the unblock mode intensity may comprise a non-zero intensity of the infrared light, and that assists with illuminating the items located behind the variable transmissivity screen 108. For example, presence of some infrared light in the unblock mode may better illuminate features such as contours of the license plate 112, and/or may generally assist with the image sensor 104 acquiring images in the unblock mode where features of images are discernible. Nonetheless, in most instances, in the unblock mode, the unblock mode intensity may be at a minimum possible intensity of the infrared light and/or zero.

Furthermore, analyzing the images at the block 304 to determine whether the image sensor 104 is saturated may comprise determining whether given features are present and/or discernible in the images, as has already been described, whether or not the infrared light source 106 is used or not.

Similarly, whether or not the infrared light source 106 is used, the process 300 may further include, but is not limited to, the controller 218, and/or the computing device 102 performing the calibration process comprising: adjusting the transmissivity of the variable transmissivity screen 108 until features in images from the image sensor 104 are no longer discernible when determining block mode settings for the infrared light source 106.

Indeed, in particular examples, adjusting the variable transmissivity screen 108 may include, but is not limited to, one or more of: increasing the transmissivity of the variable transmissivity screen 108, for example until features in images from the image sensor 104 are no longer discernible; and decreasing the transmissivity of the variable transmissivity screen 108, for example until features in images from the image sensor 104 are discernible. Indeed, whether the transmissivity of the variable transmissivity screen 108 is increased or decreased may depend on the transmissivity of the variable transmissivity screen 108 at the beginning of the process 300. Indeed, any suitable transmissivity of the variable transmissivity screen 108 at the beginning of the process 300 is within the scope of the present specification, including, but not limited to, the transmissivity of the variable transmissivity screen 108 being at a minimum transmissivity, a maximum transmissivity or a halfway transmissivity between the minimum transmissivity and the maximum transmissivity.

Put another way, the process 300 may further include the controller 218, and/or the computing device 102 performing the calibration process that includes: varying a transmissivity state of the variable transmissivity screen 108 in combination with the image sensor 104 acquiring, through the variable transmissivity screen 108, calibration images of items behind the variable transmissivity screen 108; when the calibration images do not include the items, storing e.g., at the block 308) a respective current transmissivity state as the block mode transmissivity state; and when the calibration images include the items, storing (e.g., at the block 310) a current transmissivity state as the unblock mode transmissivity state. Indeed, such an example may occur when the infrared light source 106 is not used and/or placed into a minimum intensity state for the block mode, and the like.

Alternatively or in addition, the process 300 may further comprise performing the calibration process comprising: varying a light intensity of the infrared light source 106 while varying a transmissivity state of the variable transmissivity screen 108 in combination with the image sensor 104 acquiring, through the variable transmissivity screen 108, calibration images of the items behind the variable transmissivity screen 108; when the calibration images include the items, storing a current intensity of the infrared light as the unblock mode intensity and storing a current transmissivity state as the unblock mode transmissivity state; and when the calibration images do not include the items, storing a respective current intensity as the block mode intensity and storing a respective current transmissivity state as the block mode transmissivity state.

Furthermore, when both the infrared light source 106 and the variable transmissivity screen 108 are used, the process 300 may further include, but is not limited to, the controller 218, and/or the computing device 102, varying a light intensity of the infrared light source 106 while varying the transmissivity state of the variable transmissivity screen 108 in combination with the image sensor 104 acquiring, through the variable transmissivity screen 108, the calibration images of the items behind the variable transmissivity screen 108; when the calibration images include the items, storing the current transmissivity state as the unblock mode transmissivity state and storing a current intensity as an unblock mode intensity; and when the calibration images do not include the items, storing a respective current transmissivity state as the block mode transmissivity state and storing a respective current intensity as a block mode intensity.

Indeed, acquisition of images from the image sensor 104 and controlling the infrared light source 106 and/or the variable transmissivity screen 108 may occur in a feedback loop until block mode settings and the unblock mode settings are determined that meet the various criteria described herein.

It is further understood that when the block 316 is being implemented, the process 300 may further include the controller 218, and/or the computing device 102, repeating the calibration process when the images acquired through the variable transmissivity screen 108 in the unblock mode, no longer include the items and/or when, in the unblock mode the images from the image sensor 104 become saturated.

Put another way, the calibration process of the blocks 302 to 314 may be repeated when, in the unblock mode, features of images acquired by the image sensor 104 are no longer discernible and/or the image sensor 104 become saturated. Such an example assumes that, during implementation of the block 316, analysis of the images continues by the controller 218, and/or the computing device 102 such as described with respect to the blocks 304, 306. Furthermore such a situation may occur as ambient light changes in the system 100.

Now again considering examples where the infrared light source 106 is not present and/or not used, at the block 316, the process 300 may further include the controller 218, and/or the computing device 102, synchronizing the image sensor 104 and the variable transmissivity screen 108 to alternate between: an unblock mode where: the image sensor 104 acquires images through the variable transmissivity screen 108; and the variable transmissivity screen 108 is controlled to an unblock mode transmissivity state that transmits light; and a block mode where: the image sensor 104 does not acquire the images; and the variable transmissivity screen 108 is controlled to a block mode transmissivity state that at least partially blocks the light from being transmitted therethrough.

Furthermore, the process 300 may include, at the block 316, the controller 218, and/or the computing device 102, synchronizing between the unblock mode and the block mode according to a given pattern and/or varying a pattern of synchronizing between the unblock mode and the block mode. Indeed, the pattern may be varied randomly in case a malicious operator of the other image sensor 118 is attempting to analyze the pattern to control the other image sensor 118 into block and unblock modes to attempt to acquire images of the license plate 112 and/or the person 114.

Indeed, the calibration process may be repeated periodically, for example to change the pattern and/or frequency and/or duty cycle of the infrared light source 106, and/or encryption between the components of the system 100 may be periodically updated, in case a malicious operator of the other image sensor 118 is attempting to analyze the pattern to control the other image sensor 118 into block and unblock modes to attempt to acquire images of the license plate 112 and/or the person 114.

Indeed, the process 300 may be further understood to include the controller 218, and/or the computing device 102:

determining an unblock mode where: the image sensor 104 acquires images through the variable transmissivity screen 108; and the combination of the infrared light source 106 and the variable transmissivity screen 108 are respectively controlled to: an unblock mode intensity where the image sensor 104 is unsaturated; and an unblock mode transmissivity state that transmits light; determining a block mode where: the image sensor 104 does not acquire the images; and the combination of the infrared light source 106 and the variable transmissivity screen 108 are respectively controlled to: a block mode intensity where other image sensors 118 are at least partially saturated; and a block mode transmissivity state that at least partially blocks the light from being transmitted therethrough, such that, in the block mode, the other image sensors 118 are prevented from acquiring respective images that include items located behind the variable transmissivity screen 108; and synchronizing the image sensor 104 and a combination of the infrared light source 106 and the variable transmissivity screen 108 to alternate between the unblock mode and the block mode.

Furthermore, the process 300 may include establishing synchronization between the image sensor 104, the infrared light source 106 and the variable transmissivity screen 108, for example by using time synchronization protocols, synchronization signals, and the like. Indeed, assuming that the infrared light source 106 and the variable transmissivity screen 108 effectively strobe when synchronized with the image sensor 104, any suitable synchronization protocol for synchronizing strobing lights with cameras that is commonly used in photography may be used to establish synchronization between the image sensor 104, the infrared light source 106 and the variable transmissivity screen 108.

Figure 4:
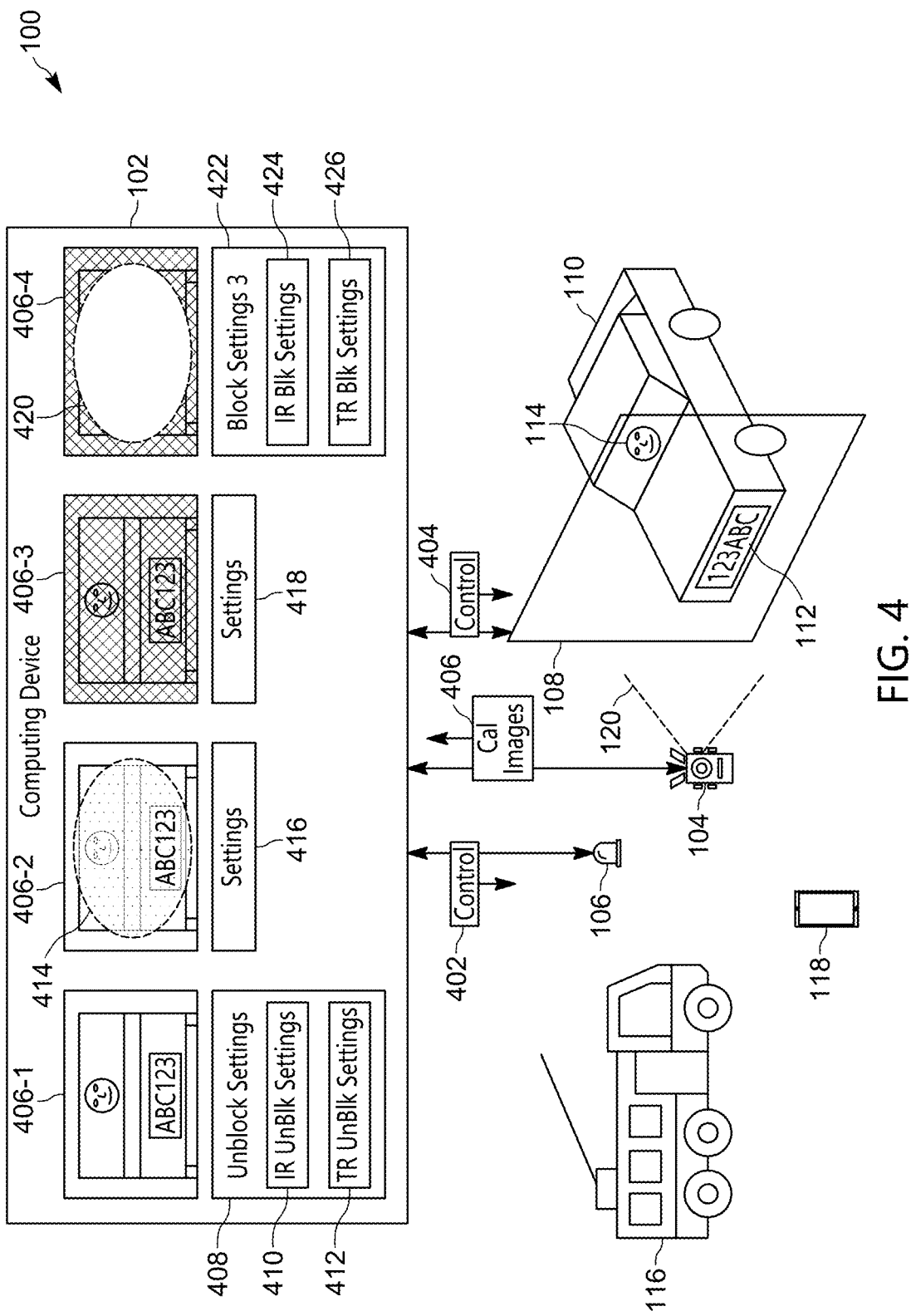
FIG. 4 depicts the system of FIG. 1 implementing a calibration process for blocking unauthorized image acquisition using infrared lights and variable transmissivity screens, in accordance with some examples.
Figure 5:
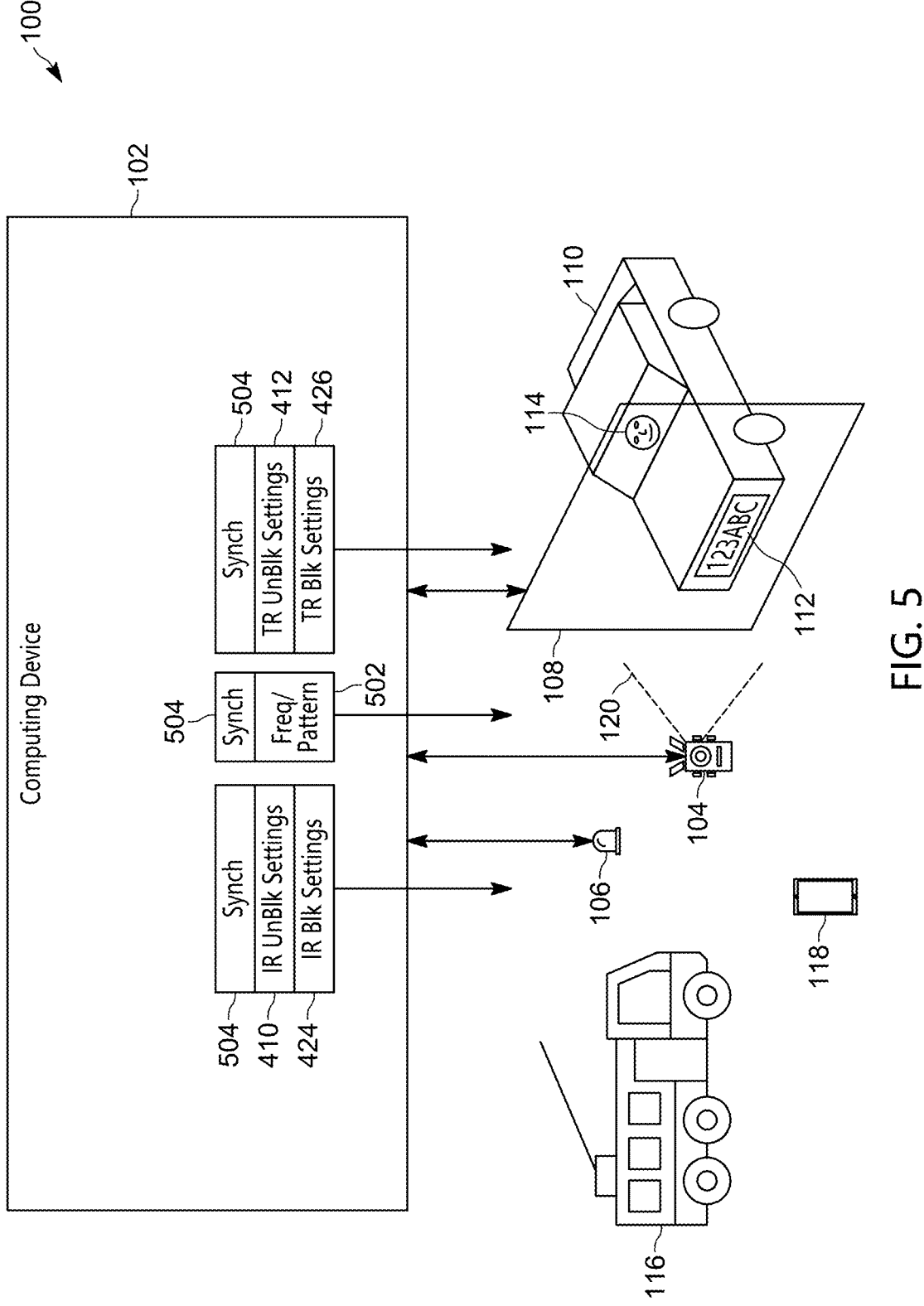
FIG. 5 depicts the system of FIG. 1 configuring components for blocking unauthorized image acquisition using infrared lights and variable transmissivity screens, in accordance with some examples.

Attention is next directed to FIG. 4, FIG. 5, FIG. 6, and FIG. 7, which depict an example of the process 300 being implemented in the system 100. FIG. 4, FIG. 5, FIG. 6, and FIG. 7 are similar to FIG. 1, with like components having like numbers. In particular, FIG. 4 and FIG. 5 depict an example of a calibration of the system 100, while FIG. 6 and FIG. 7 respectively depict the system 100 in a block mode and an unblock mode.

Attention is next directed to FIG. 4, which depicts the computing device 102 controlling the infrared light source 106 and the variable transmissivity screen 108 to respectively vary between different combinations of infrared light intensities and transmissivity states, for example by providing, to the infrared light source 106 and the variable transmissivity screen 108, respective control signals 402, 404. While infrared light intensities and transmissivity states of the infrared light source 106 and the variable transmissivity screen 108 are varied, the computing device 102 receives calibration images 406 from the image sensor 104.

The computing device 102 further analyzes the calibration images 406, four of which are depicted at the computing device 102, as calibration images 406-1, 406-2, 406-3, 406-4.

For example, the first calibration image 406-1 is understood to include the license plate 112 and facial features of the person 114, and hence respective settings of the infrared light source 106 and the variable transmissivity screen 108 may be used as unblock mode settings 408, that include infrared light source unblock mode settings 410 (e.g., also labelled as "IR UnBlk Settings") and transmissivity screen unblock mode settings 412 (e.g., also labelled as "TR UnBlk Settings"). For example, the infrared light source unblock mode settings 410 may indicate that the intensity of the infrared light emitted by the infrared light source 106 is at a minimum intensity, while the transmissivity of the variable transmissivity screen 108 is at a maximum transmissivity.

In contrast, the second calibration image 406-2 is understood to indicate that the image sensor 104 is at least partially saturated (e.g., pixel values in a region 414 are close to a maximum value) by infrared light from the infrared light source 106, while the transmissivity of the variable transmissivity screen 108 is at a maximum. However, as the license plate 112 and facial features of the person 114, are still at least partially discernible, settings 416 of the infrared light source 106 and the variable transmissivity screen 108 may be discarded. For example, the settings 416 may be discarded as the license plate 112 and facial features of the person 114 are still at partially discernible, and hence may not be used for block mode settings. Furthermore, while the license plate 112 and facial features of the person 114 are still at least partially discernible, the computing device 102 may compare the discernibility with the discernibility of the license plate 112 and facial features of the person 114 in the first calibration image 406-1, and discard the settings 416 for use as unblock mode settings, as such discernibility may be poor relative to the first calibration image 406-1. For example, the license plate 112 and facial features of the person 114 may be discernible in the second calibration image 406-2, but may have associated pixel values that are higher than in the first calibration image 406-1.

In further contrast, the third calibration image 406-3 is understood to indicate that the image sensor 104 is not saturated (e.g., the infrared light from the infrared light source 106 may be at a minimum), and that the transmissivity of the variable transmissivity screen 108 is at a minimum. However, as the license plate 112 and facial features of the person 114, are still at partially discernible, settings 418 of the infrared light source 106 and the variable transmissivity screen 108 may be discarded. For example, the settings 418 may be discarded as the license plate 112 and facial features of the person 114 are still at partially discernible, and hence may not be used for block mode settings. Furthermore, while the license plate 112 and facial features of the person 114 are still at partially discernible, the computing device 102 may compare the discernibility with the discernibility of the license plate 112 and facial features of the person 114 in the first calibration image 406-1, and discard the settings 418 for use as unblock mode settings as the such discernibility may be poor relative to the first calibration image 406-1. For example, the license plate 112 and facial features of the person 114 may be discernible in the second calibration image 406-2, but may have associated pixel values that are lower than in the first calibration image 406-1.

However, relative discernability may also be determined via a scoring scheme. For example, when machine learning algorithms are used for feature extraction and/or object recognition, such machine learning algorithms may generally output a score along with indications of extracted features and/or recognized objects (e.g., a number of the license plate 112). Calibration images 406 associated with highest scores for feature extraction and/or object recognition may be used to determine the unblock mode settings 408.

However, the fourth calibration image 406-4 is understood to have been acquired while the intensity of infrared light emitted by the infrared light source 106 was high and/or between a 50% intensity and a maximum intensity. For example, the image sensor 104 is saturated at least in a region 420. Similarly, the fourth calibration image 406-4 is further understood to have been acquired while a transmissivity of the variable transmissivity screen 108 was low and/or between a 50% transmissivity and a minimum transmissivity, and/or while the variable transmissivity screen 108 was at least partially opaque. Regardless, the license plate 112 and the facial features of the person 114 are understood to be not discernible at the fourth calibration image 406-4.

Hence respective settings of the infrared light source 106 and the variable transmissivity screen 108 may be used as block mode settings 422, that include infrared light source block mode settings 424 (e.g., also labelled as "IR Blk Settings") and transmissivity screen block mode settings 426 (e.g., also labelled as "TR Blk Settings").

Attention is next directed to FIG. 5, which depicts the computing device 102 synchronizing the image sensor 104, and infrared light source 106 and the variable transmissivity screen 108 to alternate between a block mode and an unblock mode.

For example, the computing device 102 provides, to the infrared light source 106, the infrared light source unblock mode settings 410 and the infrared light source block mode settings 424, and further provides to, the variable transmissivity screen 108, the variable transmissivity screen unblock mode settings 412 and the variable transmissivity screen block mode settings 426. Such settings may also include a frequency 502 and/or pattern of alternation between the block mode and the unblock mode, and such a frequency 502 and/or pattern of alternation is furthermore provided to the image sensor 104.

The computing device 102 further provides to the image sensor 104, the infrared light source 106 and the variable transmissivity screen 108 a synchronization signal 504 that may cause the image sensor 104, the infrared light source 106 and the variable transmissivity screen 108 to begin alternating between the block mode and the unblock mode. For example, while not depicted, the image sensor 104, the infrared light source 106 and the variable transmissivity screen 108 may comprise respective clocks that are synchronized according to the synchronization signal 504, and the synchronization signal 504 may further indicate a time when the image sensor 104, the infrared light source 106 and the variable transmissivity screen 108 are to begin alternating between the block mode and the unblock mode. The synchronization signal 504 may further include, and/or be provided with, the aforementioned one-time password.

It is further understood that, the initial calibration process depicted in FIG. 4 and FIG. 5 may be optional at the scene of the incident. Rather, the settings 410, 412, 424, 426 may be determined "off-line" and obtained by the computing device 102 from a CAD system. In some of these examples, a measurement of ambient light at the scene of the incident (e.g., by way of the image sensor 104 being operated to acquire an image that indicates an intensity of the ambient light, and settings 410, 412, 424, 426 associated with such an intensity of the ambient light may be requested, by the computing device 102, from the CAD system. Alternatively, or in addition, the computing device 102 may store combinations of intensities of ambient light and associated settings 410, 412, 424, 426.

Figure 6:
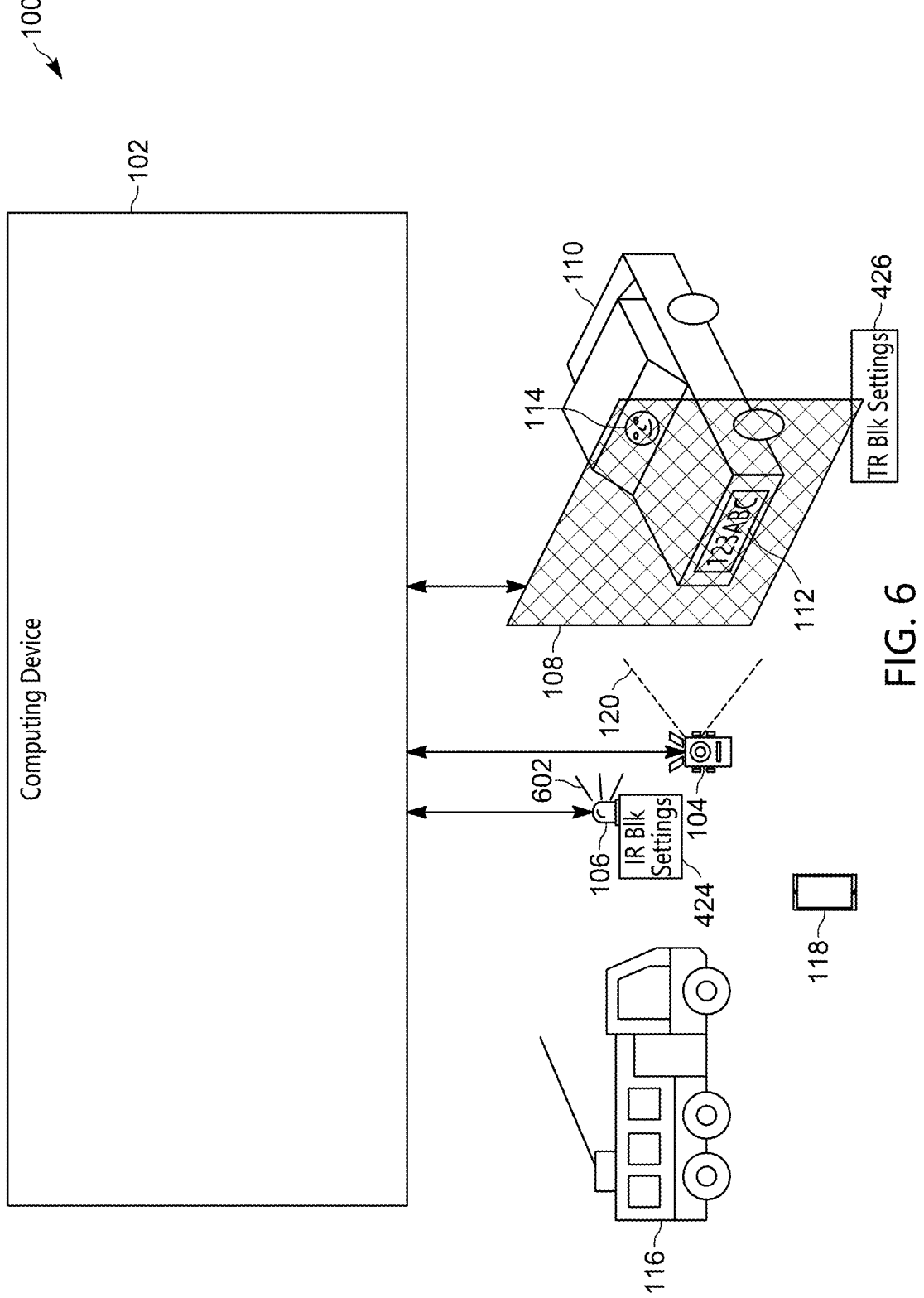
FIG. 6 depicts the system of FIG. 1 in a block mode, in accordance with some examples.

Attention is next directed to FIG. 6, which depicts the system 100 in a block mode. In particular, the infrared light source 106 is understood to be operating according to the infrared light source block mode settings 424 and emitting infrared light 602, and the variable transmissivity screen 108 is understood to be operating according to the variable transmissivity screen block mode settings 426. Furthermore, the image sensor 104 is not acquiring images.

While the infrared light 602 is depicted as being directed at the vehicle 110, the infrared light 602 may be emitted over 360°.

Furthermore, the variable transmissivity screen 108 operating according to the variable transmissivity screen block mode settings 426 causes the variable transmissivity screen 108 to be at least partially opaque.

Regardless, the combination of the infrared light 602 and the variable transmissivity screen 108 being at least partially opaque prevents the other image sensor 104 from acquiring images of the vehicle 110 where the license plate 112 and facial features of the person 114 are discernible, similar to as depicted in the fourth calibration image 406-4.

Figure 7:
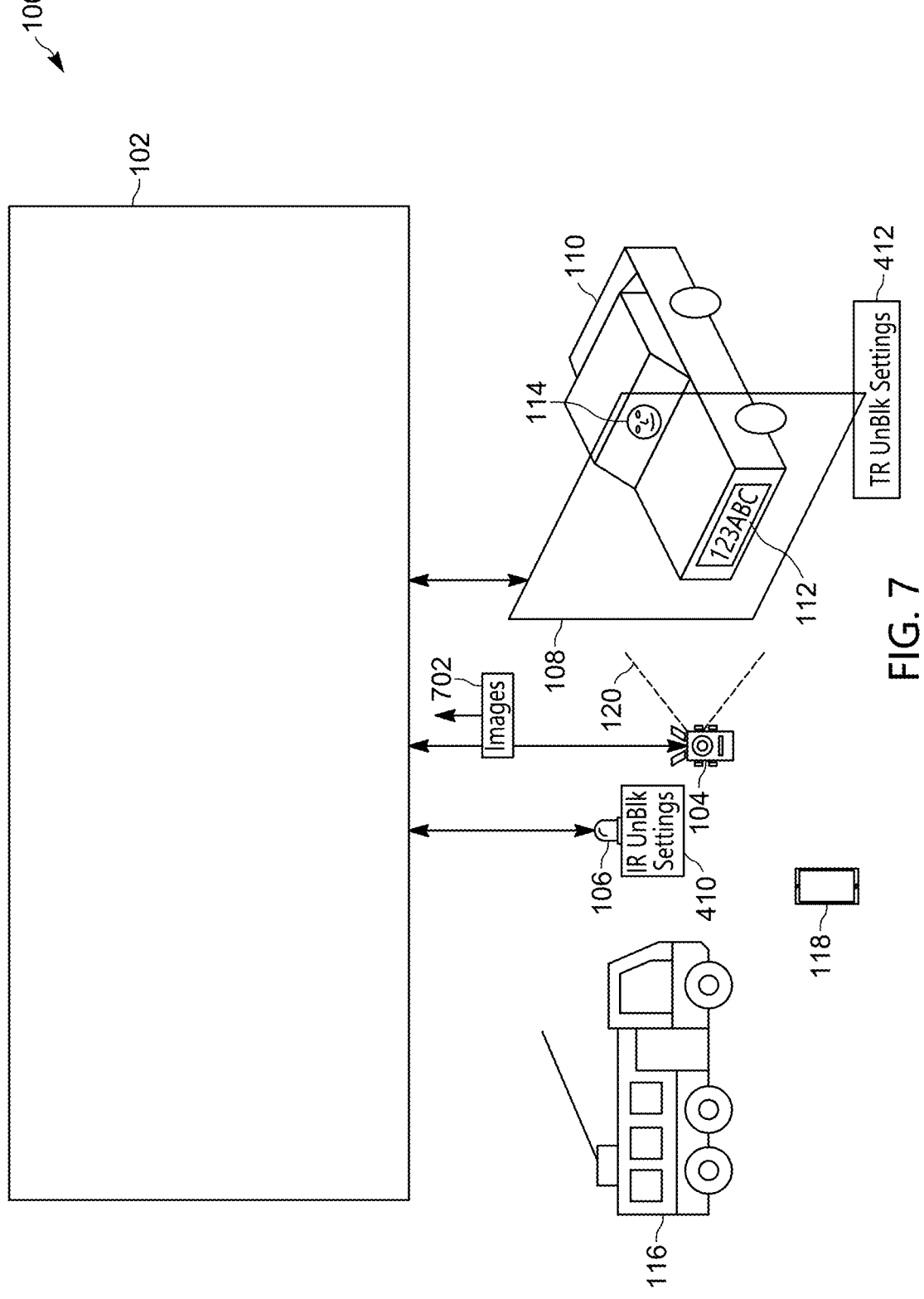
FIG. 7 depicts the system of FIG. 1 in an unblock mode, in accordance with some examples.

Attention is next directed to FIG. 7, which depicts the system 100 in an unblock mode. In particular, the infrared light source 106 is understood to be operating according to the infrared light source unblock mode settings 410, and the variable transmissivity screen 108 is understood to be operating according to the variable transmissivity screen unblock mode settings 412. Furthermore, the image sensor 104 is acquiring images 702 and optionally providing the images 702 to the computing device 102; alternatively, or in addition, the images 702 may be stored locally at the image sensor 104.

In particular, the infrared light source 106 is understood to be not emitting infrared light and/or emitting infrared light according to the infrared light source unblock mode settings 410, while the variable transmissivity screen 108 is understood to be at least partially transparent and/or at a transmissivity specified by the variable transmissivity screen unblock mode settings 412.

The images 702 may hence be similar to the first calibration image 406-1 in which the license plate 112 and facial features of the person 114 are discernible.

However, presuming that the system 100 alternates at the frequency 502 and/or pattern of alternation between the block mode and unblock mode, the other image sensor 118 is understood to be generally unable to acquire images at any mode of the system 100, as the frequency 502 and/or pattern of alternation is understood to be at a value where the other image sensor 118 is exposed to the infrared light from the infrared light source 106 (e.g., in the block mode) at a respective rolling shutter speed thereof, and/or views the variable transmissivity screen 108 as, on average, at least partially opaque. Put another way, any images acquired by the other image sensor 118 in any mode of the system 100 may appear similar to the fourth calibration image 406-4.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, acquire or process digital images, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions and/or program code (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions and/or program code, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer read-able code stored thereon for programming a computer (e.g., comprising a processor) to perform a method as described and claimed herein. Any suitable computer-usable or com-puter readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in con-nection with the instruction execution system, apparatus, or device.

Further, it is expected that one of ordinary skill, notwith-standing possibly significant effort and many design choices motivated by, for example, available time, current technol-ogy, and economic considerations, when guided by the concepts and principles disclosed herein will be readily capable of generating such software instructions and pro-grams and ICs with minimal experimentation. For example, computer program code for carrying out operations of various example embodiments may be written in an object oriented programming language such as Java, Smalltalk, C++, Python, or the like. However, the computer program code for carrying out operations of various example embodi-ments may also be written in conventional procedural pro-gramming languages, such as the "C" programming lan-guage or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Inter-net Service Provider).

The terms "substantially", "essentially", "approxi-mately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechani-cal or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical dis-closure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, via a computing device, calibration images acquired by an image sensor in a presence of infrared light emitted by an infrared light source;
   analyzing, via the computing device, the calibration images to determine whether the image sensor is satu-rated;
   when the image sensor is not saturated, controlling, via the computing device, the infrared light source to adjust one or more of a direction, frequency of light modu-lation, and intensity of the infrared light based on the calibration images;
   storing unblock mode settings of the infrared light source, where the infrared light does not saturate the image sensor; and
   storing block mode settings of the infrared light source, where the infrared light saturates the image sensor.

2. The method of claim 1, further comprising:
   adjusting, via the computing device, the infrared light source until the image sensor is saturated.

3. The method of claim 1, where adjusting the infrared light source includes: increasing the intensity of the infrared light emitted by the infrared light source.

4. The method of claim 1, further comprising synchro-nizing the image sensor and the infrared light source to alternate between:
   an unblock mode where: the image sensor is acquiring images; and the infrared light does not saturate the image sensor; and
   a block mode where: the image sensor is not acquiring the images; and the infrared light saturates other image sensors.

5. The method of claim 1, wherein analyzing the images to determine whether the image sensor is saturated com-prises determining whether given features are present in the images.

6. A computing device comprising:

a controller communicatively coupled to an image sensor and a variable transmissivity screen, the variable transmissivity screen controllable to different transmissivity states; and a computer-readable storage medium having stored thereon program instructions that, when executed by the controller, causes the controller to perform a set of operations comprising:

synchronizing the image sensor and the variable transmissivity screen to alternate between:

an unblock mode where: the image sensor acquires images through the variable transmissivity screen; and the variable transmissivity screen is controlled to an unblock mode transmissivity state that transmits light; and a block mode where: the image sensor does not acquire the images; and the variable transmissivity screen is controlled to a block mode transmissivity state that at least partially blocks the light from being transmitted therethrough.

7. The computing device of claim 6, wherein the set of operations further comprises:

synchronizing between the unblock mode and the block mode according to a given pattern.

8. The computing device of claim 6, wherein the set of operations further comprises:

varying a pattern of synchronizing between the unblock mode and the block mode.

9. The computing device of claim 6, wherein the set of operations further comprises, prior to the synchronizing, performing a calibration process comprising:

varying a transmissivity state of the variable transmissivity screen in combination with the image sensor acquiring, through the variable transmissivity screen, calibration images of items behind the variable transmissivity screen;

when the calibration images include the items, storing a current transmissivity state as the unblock mode transmissivity state; and when the calibration images do not include the items, storing a respective current transmissivity state as the block mode transmissivity state.

10. The computing device of claim 9, wherein the controller is further communicatively coupled to an infrared light source, and the calibration process further comprises:

varying a light intensity of the infrared light source while varying the transmissivity state of the variable transmissivity screen in combination with the image sensor acquiring, through the variable transmissivity screen, the calibration images of the items behind the variable transmissivity screen;

when the calibration images include the items, storing the current transmissivity state as the unblock mode transmissivity state and storing a current intensity as an unblock mode intensity; and when the calibration images do not include the items, storing a respective current transmissivity state as the block mode transmissivity state and storing a respective current intensity as a block mode intensity.

11. The computing device of claim 9, wherein the set of operations further comprises:

repeating the calibration process when the images acquired through the variable transmissivity screen in the unblock mode, no longer include the items.

12. The computing device of claim 9, wherein the items comprise one or more of a facial features and license plate features.

13. A system comprising:

an infrared light source;

a variable transmissivity screen controllable to different transmissivity states;

an image sensor; and a computing device communicatively coupled to the infrared light source, the variable transmissivity screen and the image sensor, the computing device storing program instructions that, when executed by the computing device, causes the computing device to perform a set of operations comprising:

determining an unblock mode where: the image sensor acquires images through the variable transmissivity screen; and the combination of the infrared light source and the variable transmissivity screen are respectively controlled to: an unblock mode intensity where the image sensor is unsaturated; and an unblock mode transmissivity state that transmits light;

determining a block mode where: the image sensor does not acquire the images; and the combination of the infrared light source and the variable transmissivity screen are respectively controlled to: a block mode intensity where other image sensors are at least partially saturated; and a block mode transmissivity state that at least partially blocks the light from being transmitted therethrough, such that, in the block mode, the other image sensors are prevented from acquiring respective images that include items located behind the variable transmissivity screen; and synchronizing the image sensor and a combination of the infrared light source and the variable transmissivity screen to alternate between the unblock mode and the block mode.

14. The system of claim 13, wherein the set of operations further comprises:

synchronizing between the unblock mode and the block mode according to a given pattern.

15. The system of claim 13, wherein the set of operations further comprises:

varying a pattern of synchronizing between the unblock mode and the block mode.

16. The system of claim 13, wherein the set of operations further comprises, prior to the synchronizing, performing a calibration process comprising:

varying a light intensity of the infrared light source while varying a transmissivity state of the variable transmissivity screen in combination with the image sensor acquiring, through the variable transmissivity screen, calibration images of the items behind the variable transmissivity screen;

when the calibration images include the items, storing a current intensity of the infrared light as the unblock mode intensity and storing a current transmissivity state as the unblock mode transmissivity state; and when the calibration images do not include the items, storing a respective current intensity as the block mode intensity and storing a respective current transmissivity state as the block mode transmissivity state.

17. The system of claim 16, wherein the set of operations further comprises:

repeating the calibration process when the images acquired through the variable transmissivity screen in the unblock mode, no longer include the items.

18. The system of claim 13, wherein the unblock mode intensity comprises one or more of zero and a minimum possible intensity of the infrared light.

19. The system of claim 13, wherein the unblock mode intensity comprises a non-zero intensity of the infrared light, and that assists with illuminating the items located behind the variable transmissivity screen.

* * * * *